(No Model.)

J. LINDSAY.
TOOTHED WHEEL.

No. 480,930. Patented Aug. 16, 1892.

Witnesses.
Louis W. Gowell
Edward F. Allen

Inventor.
John Lindsay.
by Crosby & Gregory
Attys.

THE NORRIS PETERS CO., PHOTO-LITHO., WASHINGTON, D. C.

UNITED STATES PATENT OFFICE.

JOHN LINDSAY, OF MILLBURY, MASSACHUSETTS.

TOOTHED WHEEL.

SPECIFICATION forming part of Letters Patent No. 480,930, dated August 16, 1892.

Application filed September 7, 1891. Serial No. 404,978. (No model.)

*To all whom it may concern:*

Be it known that I, JOHN LINDSAY, a subject of the Queen of Great Britain, residing at Millbury, county of Worcester, State of Massachusetts, have invented an Improvement in Toothed Wheels, of which the following description, in connection with the accompanying drawings, is a specification, like letters on the drawings representing like parts.

This invention has for its object to produce a toothed wheel which shall permit of ready change to vary the diameter of the wheel, and wherein the teeth when worn may be readily replaced by new teeth without removing the wheel from the shaft upon which it is mounted.

In accordance with this invention the frame or wheel proper is formed to receive and hold a ring having upon its periphery a series of teeth. This ring may be replaced at any time by a ring of the same size to provide new teeth or by a ring of greater or less external diameter to thus provide a larger or smaller wheel. If desired, the teeth may be of wood inserted into suitable recesses in the ring referred to.

One part of this invention in toothed wheels therefore consists of a wheel-frame combined with a recessed tooth-carrying ring carried thereby, a series of independent teeth inserted in said recesses, a clamping-plate bearing against said teeth, and fastenings extended through said plate, ring, and frame, substantially as will be described.

Other features of this invention will be hereinafter described, and pointed out in the claims.

Figure 1:
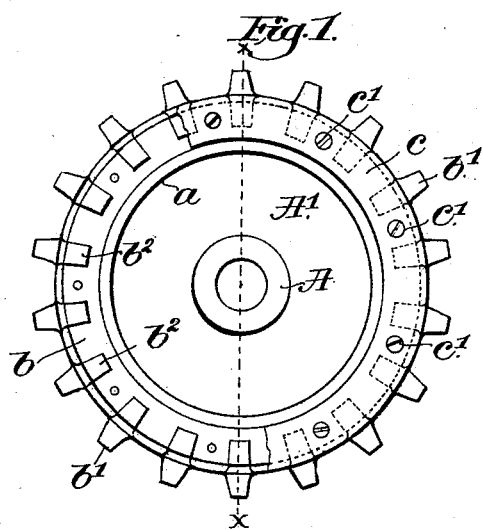
Figure 2:
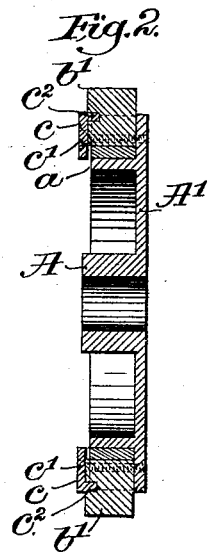
Figure 3:
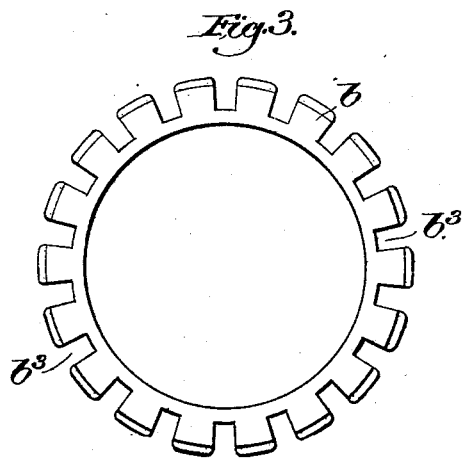
Figure 4:
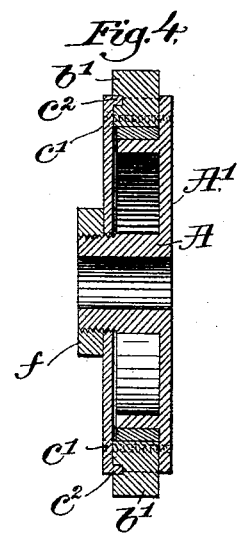

Figure 1 represents in elevation, partially broken away, a wheel embodying this invention; Fig. 2, a section of the same on the dotted line $x\,x$. Fig. 3 shows the tooth-carrying ring by itself; Fig. 4, a modification to be described.

A represents the hub and A' the web or frame of any suitable wheel, said frame, as herein represented, being provided with an annular rib $a$, which forms a seat for the tooth-carrying ring $b$, (shown separately in Fig. 3,) and provided upon its periphery with teeth $b'$, herein represented as of wood, having their shanks $b^2$ fitted into suitable recesses $b^3$ in the ring $b$. The thickness of the teeth $b'$ is slightly greater than the thickness of the ring $b$, so that the clamping ring or plate $c$, when drawn toward the web or frame of the wheel by the clamping-screws $c'$, will first bear upon the projecting faces of the teeth rather than upon the surface of the ring to hold the teeth firmly in place and prevent them from dropping out by reason of shrinkage, as they would be liable to do if the clamping-ring did not hold them in place. The teeth $b'$ may, however, be formed integral with the ring $b$, if desired, although for many kinds of service the wooden teeth are preferable. If the teeth become worn, the clamping-plate $c$ may be removed and the ring $b$ replaced by a new ring carrying a fresh set of teeth, or a new set of teeth may be substituted for the worn teeth already in the ring and the same ring replaced for further service.

If it is desired to effect a change in the gearing of the mechanism in which the wheel is employed, the tooth-carrying ring $b$ may be removed and a ring of greater or less external diameter substituted in its place, the inner diameter, however, of all the rings being the same to fit the seat $a$.

The clamping-plate $c$ will preferably be provided with an inturned flange $c^2$, (see Fig. 2,) which will enter corresponing grooves in the faces of the teeth $b'$, and on the ring $b$ when the teeth are made separate from the ring.

Fig. 4 shows a modified construction wherein the clamping-plate is held by a nut $f$, threaded upon the hub A of the wheel, thus dispensing with the screws $c'$.

This invention is particularly useful in connection with bicycles wherein wooden teeth are desirable, owing to their freedom from noise, and when worn or when it is desired to make a change of gears the ring $b$ is of sufficient inside diameter to permit it to be slipped off over the treadles without detaching the same, and new rings substituted.

This invention is not limited to the particular construction of device herein represented, as the same may be varied without departing from the spirit and scope of this invention.

I claim—

1. The combination, with a wheel-frame, of a recessed tooth-carrying ring carried thereby, a series of independent teeth inserted in said recesses, a clamping-plate bearing against said teeth, and fastenings extended through the said plate, ring, and frame, substantially as described.

2. A wheel-frame, a tooth-carrying ring, and a series of teeth carried thereby of greater thickness than said ring, combined with a clamping-plate adapted to bear against said teeth, and means to clamp the plate in position, substantially as described.

3. A wheel-frame, a tooth-carrying ring, and a series of teeth carried thereby of greater thickness than the thickness of the said ring, and provided with grooves, combined with a clamping-plate having an annular projection to enter the grooves in said teeth, substantially as described.

In testimony whereof I have signed my name to this specification in the presence of two subscribing witnesses.

JOHN LINDSAY.

Witnesses:
DENNIS J. BUCKLEY,
IRA N. GODDARD.